US006654930B1

(12) United States Patent
Zhou et al.

(10) Patent No.: US 6,654,930 B1
(45) Date of Patent: *Nov. 25, 2003

(54) VIDEO SCRIPT EDITOR

(75) Inventors: Yiming Zhou, Basingstoke (GB); Mark John McGrath, Bracknell (GB); Vincent Carl Harradine, Basingstoke (GB)

(73) Assignees: Sony Corporation, Tokyo (JP); Sony United Kingdom Limited, Weybridge (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 686 days.

(21) Appl. No.: 08/821,321

(22) Filed: Mar. 20, 1997

(30) Foreign Application Priority Data

Mar. 27, 1996 (GB) .............................................. 9606443

(51) Int. Cl.$^7$ ................................................. G06F 7/00
(52) U.S. Cl. ..................... 715/500.1; 345/716; 345/723
(58) Field of Search ................................. 345/302, 328, 345/723, 716; 715/500.1

(56) References Cited

U.S. PATENT DOCUMENTS

| 4,858,033 A | * | 8/1989 | Chippendale | 386/57 |
| 5,274,758 A | | 12/1993 | Beitel et al. | 345/302 |
| 5,404,316 A | * | 4/1995 | Klingler et al. | 364/514 |
| 5,664,087 A | | 9/1997 | Tani et al. | 345/473 |
| 5,781,687 A | * | 7/1998 | Parks | 386/52 |

FOREIGN PATENT DOCUMENTS

| EP | 0 338 753 | 10/1989 |
| EP | 0 598 597 | 5/1994 |
| JP | 04 258090 | 9/1992 |

OTHER PUBLICATIONS

S. Vigneaux: "The Integration of a Newsroom Computer System with a Server–centred News Production System" International Broadcasting Convention, Sep. 12–16, 1996, pp. 512–518, XP002113460.

* cited by examiner

*Primary Examiner*—Joseph H. Feild
*Assistant Examiner*—C B Paula
(74) *Attorney, Agent, or Firm*—Frommer Lawrence & Haug LLP; William S. Frommer; Glenn F. Savitt

(57) ABSTRACT

A sequence of video frames is assembled from video clips. The frames have time codes associated therewith. It is desired to match sections of the text (T1, T2) to corresponding sections (V1, V2) of the video sequence. Time codes (TCx, TCx+1) corresponding to the time codes of the video frames are entered into the text. A rate n of reading the words of the text is defined. The extent W of the text which matches an associated section of the video is calculated as $$W=(TCx+1-Tcx).n.$$

On a text display, the extent W of the text which matches the video section is indicated by highlighting or in other ways. More text than matches a video section may be provided. The excess text or overflow text is distinguished on the display by e.g. color from the active text which matches the video section.

10 Claims, 4 Drawing Sheets

VIDEO SCRIPT EDITOR

BACKGROUND OF THE INVENTION

1. Field of the Invention

The present invention relates to editing script associated with video sequences, and to an editing system for editing such scripts.

2. Description of the Prior Art

It is known to produce a sequence of video clips by editing source material. The sequence may for example comprise several clips assembled in an order which illustrates a news story. The news story is set out in a script which accompanies the sequence.

The sequence is required to be of a desired duration and the script is required to match the sequence, scenes within the video sequence being matched with sections of the script.

Usually the sequence of the video clips is assembled first. Then the script is written, to match the video sequence.

For a section of the script to match a corresponding section of the video sequence, the duration of the section of the video sequence and the rate of reading of the words of the script has to be taken into account. A draft script may need several adjustments in order to match it to the video sequence.

It is thus desirable to indicate to a script writer how the script matches the video sequence.

SUMMARY OF THE INVENTION

In accordance with the present invention, there is provided an editing system for associating text with a video sequence the frames of which have time codes associated therewith, the system comprising

- means for simultaneously displaying a sequence of video frames and for displaying a sequence of text associated with the sequence of video frames,
- a video store for storing the sequence of frames to be displayed and the associated time codes (VC)
- a text store for storing the sequence of associated text and time codes associated with the text,
- means for defining time codes (TC) in the text, the time codes in the text corresponding to time codes in the video sequence and indicating sections of the text, which are associated with corresponding sections of the video sequence,
- means for defining a rate (n) of reading of the words of text, and
- means for indicating on the display the extent of the text which matches the associated section of the video sequence in dependence upon the time codes immediately preceding (TCx) and succeeding (Tcx+1) that section of text and upon the said rate n of reading.

The script writer may provide more text than can be matched to a section of the video sequence. It is desirable to allow the script writer to view the whole text associated with a video sequence and to view how alterations to it match with the section of the video sequence.

Thus, in an embodiment of the present invention, when the said section of text associated with the video section has an extent greater than that which matches the video section, the indicating means is arranged to distinguish on the display the portion of that text in excess of that which matches the video section, from the portion which matches the video section.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

An Editor or Script Writer selects video clips to be assembled into a video sequence. In the assembled sequence the frames or groups of 2 or more frames of the assembled sequence are identified by a sequence of time codes having the form $$[HH{:}MM{:}SS{:}FF]$$

where HH is a two digital number representing hours;

MM is a two digit number representing minutes;

SS is a two digit number representing seconds; and

FF is a two digit number representing frames, or equivalently 30ths or 25ths of a second depending on whether the video frame is derived from a video signal having 525 lines at a frame rate of 30 frames per second or 625 lines at a frame rate of 25 frames per second.

Figure 1:
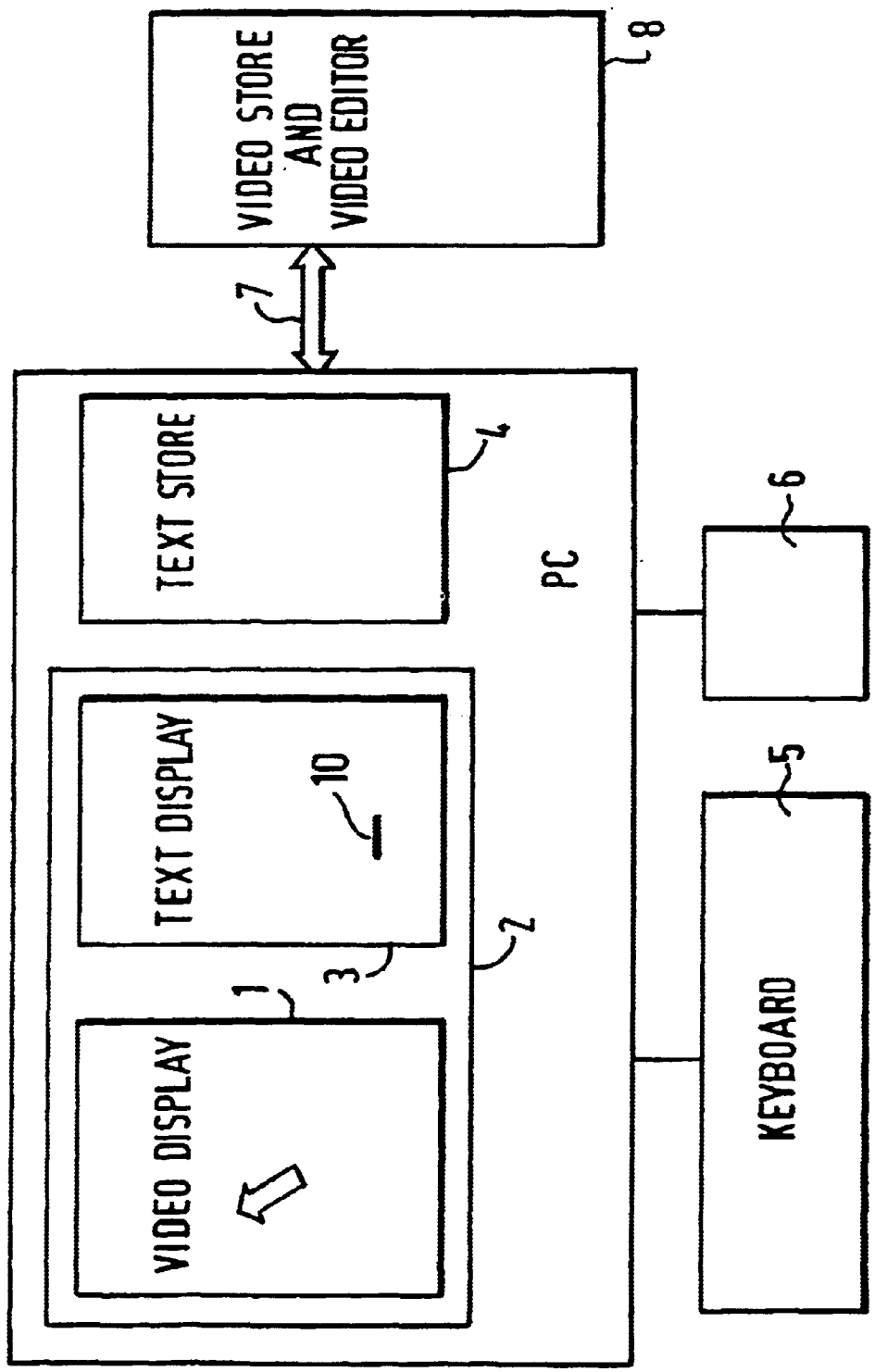
FIG. 1 is a schematic diagram of an illustrative display device of an editing system in accordance with the invention.

Referring to FIG. 1. once the video sequence has been assembled it is viewed in a video display section 1 of a display device 2. A text display section 3 is also provided. The text display section 3 displays the text of the script which is associated with the video sequence simultaneously with the display of the video sequence in section 1. The script typically has sections which match corresponding sections of the video sequence.

Figure 2:
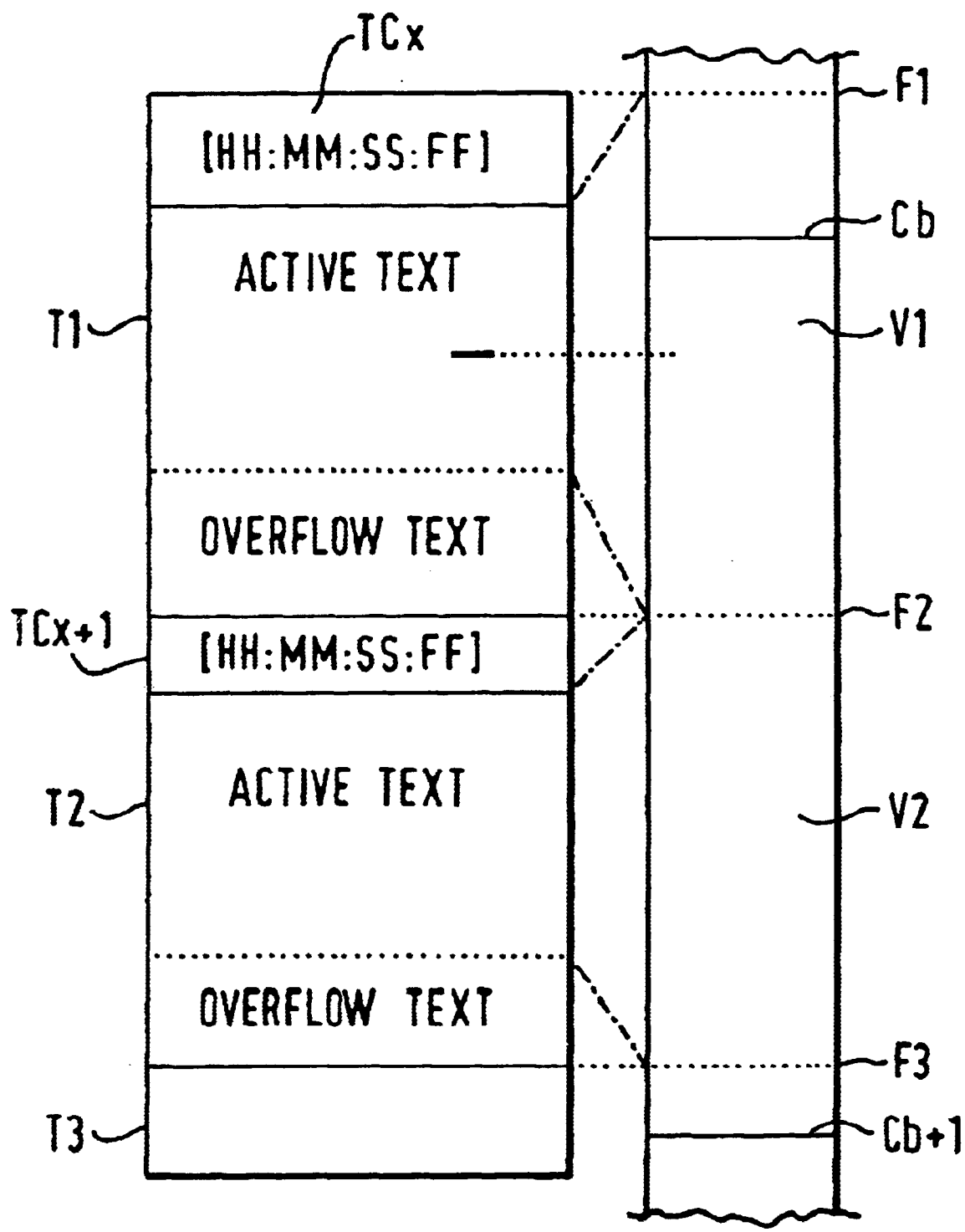
FIG. 2 is a schematic diagram illustrating correspondence between sections of video sequence and sections of text.

Referring to FIG. 2, the script writer views the assembled video sequence and decides how sections of a proposed script (T1, T2 etc) correspond to sections (V1, V2, V3 etc) of the video sequence. The Script Writer chooses frames (F1, F2 and F3) which correspond with the starts of the sections (T1, T2 etc) of the proposed script. The frames chosen to correspond to the beginnings and ends of sections of the text may, or may not correspond to beginnings Cb, Cb+1 of individual clips making up the video sequence.

The time code TCx of the video frame corresponding to the beginning of a section of text is entered into that section of the text in the form [HH:MM:SS:FF].

Successive time codes TCx, TCx+1 are entered into the text to indicate the beginnings of respective sections (T1, T2) of the text which are associated with respective sections (V1, V2) of the video sequence.

The number W of words of text which can be fitted into a section of text is a function of the duration of the section as defined by successive time codes (TCx, TCx+1) and the rate n at which the words are to be read $$W=(TCx+1-TCx).n$$

The amount of text which the script writer actually enters may exceed W. Furthermore, the writer may wish to vary the rate n of reading the words.

For that purpose, in accordance with one aspect of the present invention, there is displayed for each section (T1, T2) of text:

an active text sub-section; and an overflow or inactive text sub-section.

For the purposes of illustration, the sub-sections are separated from the active sections in FIG. 2 by a marker in the form of a dotted line, but many other ways of denoting the sub-sections could be used. For instance active text could be distinguished from overflow text by: background colour; foreground colour; highlighting, font; or by a combination of these.

The number W of words in the active text sub-section is defined by the time codes TCx and TCx+1 at the beginning of the current text section and the next text section respectively and the rate n of reading words.

Any words in excess of W are automatically entered into the overflow text sub-section.

If the number of words in the active sub-section and/or the read rate n is changed, words automatically transfer from the active sub-section to the overflow sub-section or vice versa.

It is desirable to check that the video sequence matches the text either once the text has been written or during writing of the text. Thus, in accordance with another aspect of the present invention:

the video sequence may be replayed and the text displayed under control of the time codes derived from the video sequence; and b) the video sequence may be replayed under the control of the text the frame being displayed being defined by the current position in the text; as selected by the Editor.

The current position in the text is indicated by an indicator such as a cursor or highlighting. When the video sequence controls display of the text, the text position indicator moves through the text synchronously with the video sequence. When the text controls the video sequence, movement of the indicator through the text causes the video sequence to be displayed synchronously with the movement of the text indicator.

The rate of movement through the text relative to the rate of movement through the video sequence is defined by the rate n of reading the text.

If the text section is divided into active and overflow sub-sections, the overflow sub-section is disregarded, the video sequence being controlled only by the active text and the video sequence controls only position in the active text.

Referring again to FIG. 1, the editing system comprises a computer PC which may be a laptop computer. The computer has an LCD display 2 arranged to display the video sequence in the window 1 and the text in another window 3. The computer has conventional data storage 4 for storing text, a keyboard 5 for entering text and a pointing device 6.

A conventional text editor is provided in the PC for editing the text.

The computer PC is linked by an interface 7 to a video editor 8 which includes data storage for edited video sequences. The video editor operates in known manner to produce the video sequences in which the frames or groups of 2 or more frames are allocated the time codes.

Figure 3:
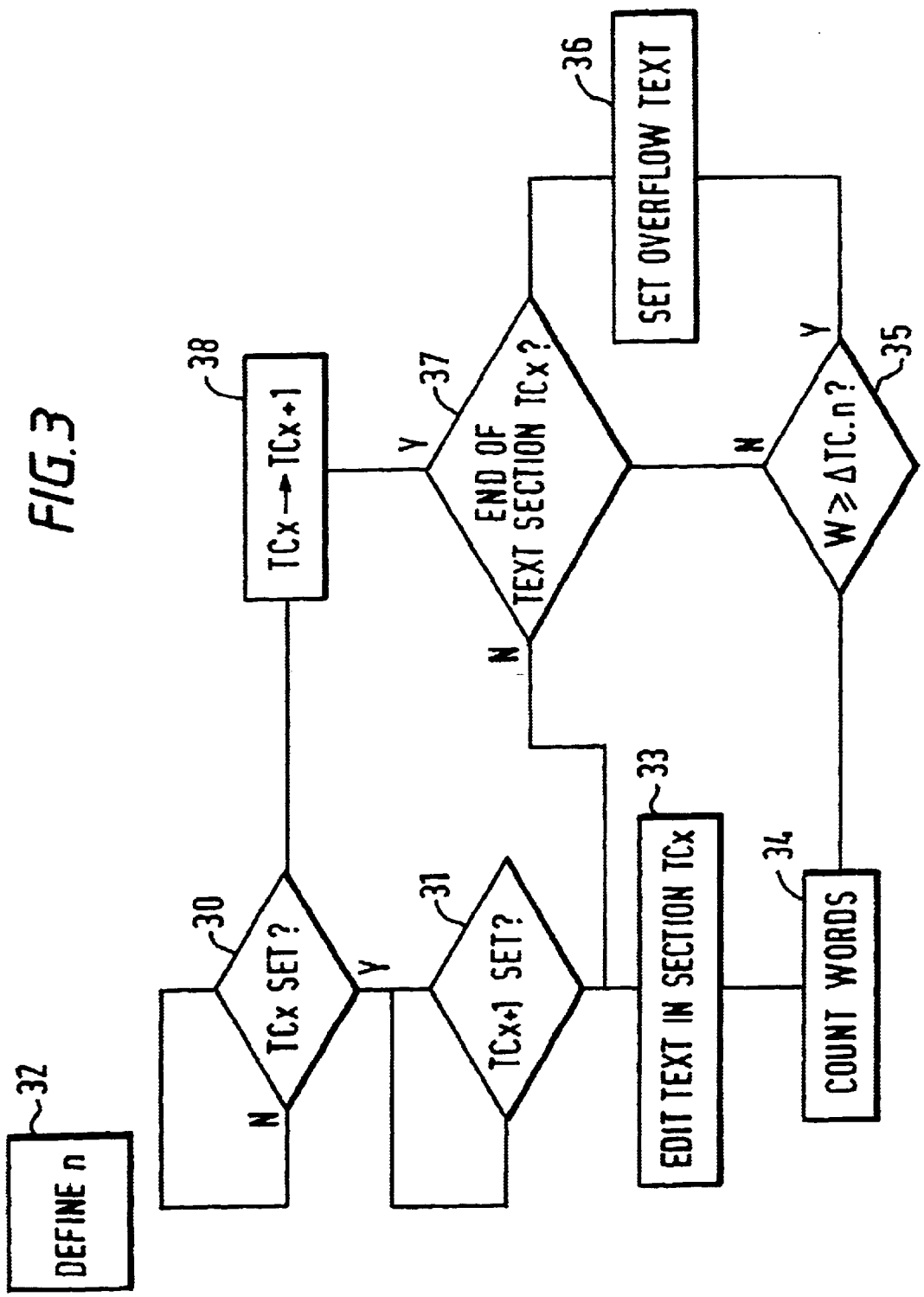
FIG. 3 is a flow diagram illustrating the manner in which text associated with a section of video is allocated to active and overflow text areas in accordance with one aspect of the invention.

Referring to FIG. 3, in order to produce a section of text corresponding to a section of video, the time codes TCx of the beginning of the section and TCx+1 of the beginning of the next section must be set in the text as indicated at steps 30 and 31.

The time codes may be entered manually using the keyboard and the text editor. Once the first time code is entered, the next code is entered with a space, eg. one line between them. The time codes are entered in the form $$[HH{:}MM{:}SS{:}FF]$$

Dialogue boxes may be provided to enter the time codes.

Alternatively the time codes are displayed with the video sequence. The video sequence is run until it reaches the frame corresponding to the start of a text section. The associated time code is then copied on to the text section, or the time codes are set to be displayed in the text section and the appropriate ones selected. As another alternative, the text and its time codes can be written and stored in a separate file and then imported in to the text editor for the video sequence.

The rate of n of reading words is set at step 32.

Once TCx and TCx+1 are set in steps 30 and 31, text is entered (step 33) into the text section beginning at TCx using the text editor and keyboard and if necessary the pointing device. The text editor counts the number W of words entered beginning at TCx at step 34.

At step 35 the number of words W of the text is compared with the number of words $\Delta TC.n$ which can be fitted into the text section where $\Delta TC=TCx+1-TCx$ and n is the rate of reading words.

If $W \geq \Delta TC.n$ then words in excess of $\Delta TC.n$ are allocated to an inactive text sub-section, as indicated at step 36.

Words are entered until the script writer indicates the end of the section of text TCx. In this example this is done by moving the cursor to the start of the next section TCx+1 of the text.

Then, at step 38, TCx+1 becomes the beginning (denoted TCx) of the new section and the new time code TCX+1 of the new section is entered at step 31.

The time codes of the sections may be changed at any time and new time codes entered into the text at any point. The position of the overflow text is recalculated for each change.

The reading rate n may be changed and consequently the position of the overflow text recalculated.

Referring to FIG. 1 again, once a video sequence has been edited and stored, and the corresponding text sequence has been edited and stored, the video store stores the video sequence with its associated time codes and the text store stores the text sequence with the its associated time codes. In the presently preferred embodiment of the invention the video time codes are identical to the text time codes. The text sequences and the video sequences are stored in files in directories in conventional manner. The computer PC via the interface 7 can access any video sequence by its directory and file names and can access any video frame in a sequence by its time code TCx. Any word number W corresponding to a particular time code TCw within the section is accessed by calculating $$W=(TC_w-TC_x).n$$

and the time code $TC_w$ of any word of word number W is calculated as $$TC_w=TC_x+W/n$$

This allows the current position in the text indicated by for example a conventional cursor 10 to be controlled in dependence upon the video frames. This also allows control of the display of the video frame in dependence upon the current text position.

Figure 4:
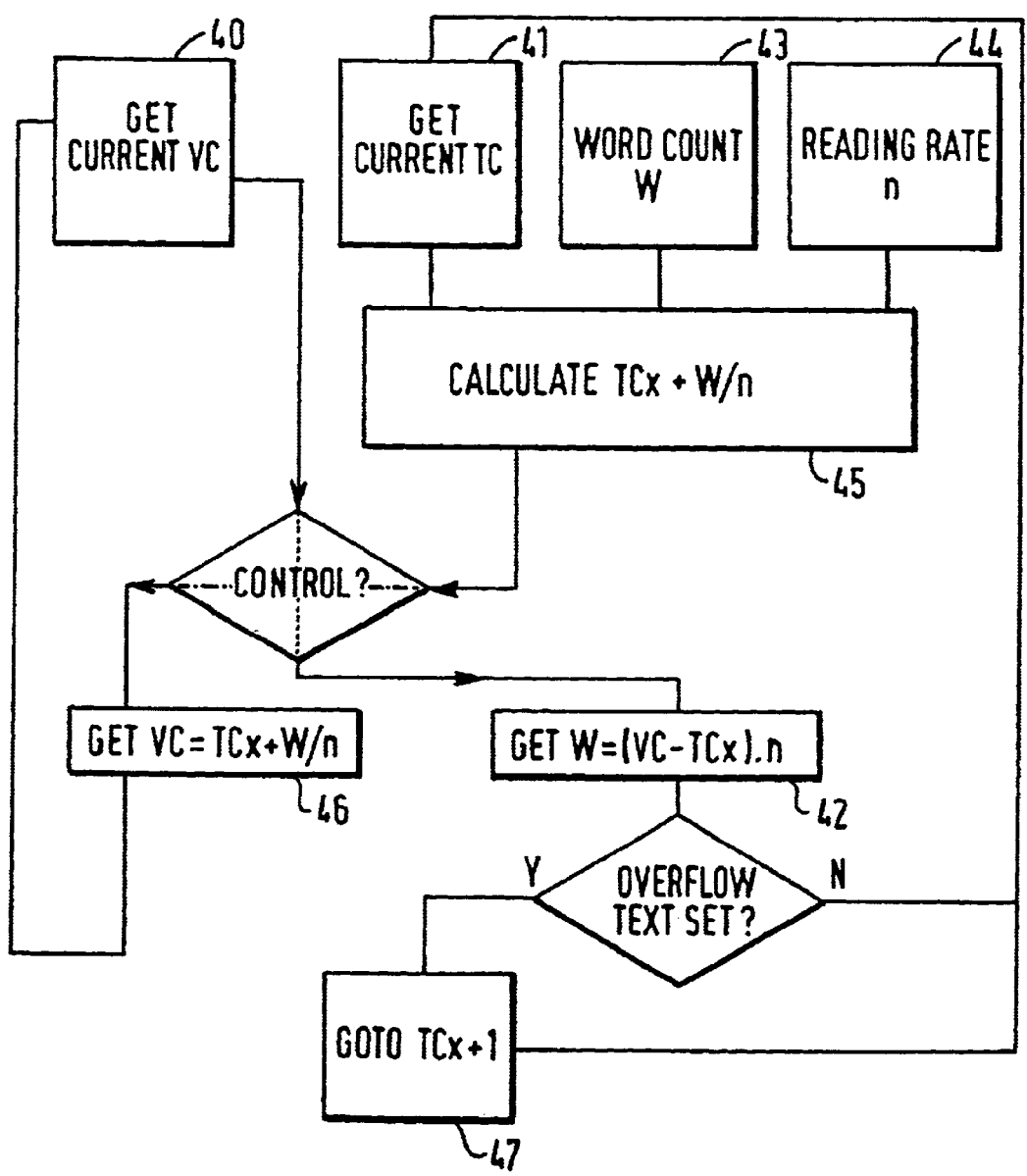
FIG. 4 is a flow diagram illustrating the manner in which the text and the video sequence are locked to each other in accordance with another aspect of the invention.

Reference will now be made to FIG. 4. Assume the video sequence and its corresponding text sequence have been accessed by the computer. Assume the video frames control the text display. The computer accesses each successive frame by its time code $VC_y$ by generating the time codes $VC_y$ one by one to call up the frames. The computer accesses (41) the text section having the nearest time code $TC_x$ less than the time code $VC_y$ of the video frame. Alternatively, the computer may derive the time codes $VC_y$ from the video sequence and access the text from the derived time codes $VC_y$, selecting the text section having the nearest time code $TC_x$ less than $VC_y$. The computer calculates the word position $W=(VC_y-TC_x).n$ and moves the cursor to that position. If the current word position is in the overflow text, the cursor jumps (47) to the next time code $TC_x+1$.

Assume now that the current position of the cursor in the text controls the video frame to be displayed.

The computer calculates (45) from the time code (41) $TC_x$ of the current section, the word count W to the current position in the section 43 and the reading rate n(44), the time code $TC_w$ of the current position, $TC_w=TC_x+W/n$.

That is also the time code of the corresponding video frame. As indicated at step 46, the computer accesses the corresponding video frame.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An editing system for associating text with a video sequence the frames of which have time codes associated therewith, the system comprising:

means for simultaneously displaying a sequence of video frames and a sequence of text associated with the sequence of video frames, a video store for storing the sequence of frames to be displayed and the associated time codes (VC), a text store for storing the sequence of associated text, means for defining time codes (TC) in the text, the time codes in the text corresponding to time codes in the video sequence and indicating sections of the text, which are associated with corresponding sections of the video sequence, means for defining a user-variable rate (n) of reading the words of text, and means for indicating on the display the extent of the text which matches the associated section of the video sequence, the text that matches being non-overflow text, and wherein any overflow text for that section being displayed in a differentiating manner relative to the displayed non-overflow text for the associated section, and with the extent of the matching text and overflow text being dependent upon the time code $TC_x$ indicating the start of that section of text, the time code $TC_x+1$ indicating the start of the succeeding section of text, and the rate (n) of reading, wherein the amount of displayed overflow text relative to the displayed non-overflow text for the associated section of the video sequence is variable by means of the user varying the reading rate (n).

2. A system according to claim 1, wherein the said section of text associated with the video section is divisible into an initial active sub-section and succeeding inactive sub-section containing said overflow text, the number of words W in the active sub-section being $W=(TC_x-TC_x+1).n$, the indicating means distinguishing the active sub-section from the inactive sub-section.

3. A system according to claim 2 wherein the indicating means distinguishes the active sub-section from the inactive sub-section by: highlighting; background colour; foreground colour; font; and/or by a marker between the sub-sections.

4. A system according to claim 1, wherein the displaying means displays the video sequence and the text sequence side by side.

5. A system according to claim 4, wherein the display means comprises a single display screen and the video sequence and the text sequence are displayed in adjacent windows on the display screen.

6. A system according to claim 1, wherein the text time codes $TC_x$ and $TC_x+1$ are identical to the time codes of the corresponding frames of the video sequence.

7. A system according to claim 1, wherein the means for defining time codes comprises means for manually entering the time codes into the text.

8. A system according to claim 1, wherein the displaying means displays the time code of the video frame being currently displayed, and the means for defining time codes comprises means for selecting such a displayed time code.

9. A system according to claim 1, further comprising a text editor for producing the sequence of text.

10. An editing system for associating text with a video sequence the frames of which have time codes associated therewith, the system comprising:

display means for simultaneously displaying a sequence of video frames and a sequence of text associated with the sequence of video frames;

a video store for storing the sequence of frames to be displayed and the associated time codes (VC), a text store for storing the sequence of associated text, first defining means for defining time codes (TC) in the text, the time codes in the text corresponding to time codes in the video sequence and indicating sections of the text, which are associated with corresponding sections of the video sequence, said first defining means including time code entry means for enabling a user to manually enter the time codes into the text;

second defining means for defining a user-variable rate (n) of reading the words of text; and indicating means for indicating on the display the extent of the text which matches the associated section of the video sequence, the text that matches being non-overflow text, and wherein any overflow text for that section being displayed in a differentiating manner relative to the displayed non-overflow text for the associated section, and with the extent of the matching text and overflow text being dependent upon the time code TCx indicating the start of that section of text, the time code TCx+1 indicating the start of the succeeding section of text, and the rate (n) of reading, wherein the amount of displayed overflow text relative to the displayed non-overflow text for the associated section of the video sequence is variable by means of the user varying the reading rate (n).

* * * * *